United States Patent [19]
Baasch et al.

[11] Patent Number: 4,595,261
[45] Date of Patent: Jun. 17, 1986

[54] PHASE RETARDATION ELEMENT AND PRISM FOR USE IN AN OPTICAL DATA STORAGE SYSTEM

[75] Inventors: Holger J. Baasch, Rochester, Minn.; Douglas S. Goodman, Yorktown Heights, N.Y.; Francis S. Luecke, Byron; Ronald L. Soderstrom, Rochester, both of Minn.; Eberhard A. Spiller, Mt. Kisco, N.Y.

[73] Assignee: International Business Machines Corporation, Armonk, N.Y.

[21] Appl. No.: 541,604

[22] Filed: Oct. 13, 1983

[51] Int. Cl.⁴ .............................. G02B 5/30; G02B 1/08
[52] U.S. Cl. .................................... 350/394; 350/164
[58] Field of Search ............. 350/394, 395, 401, 402, 350/403, 164

[56] References Cited
U.S. PATENT DOCUMENTS 2,409,407  10/1946  Turner .................. 350/395
3,703,330  11/1972  Allen .................... 350/394
4,312,570  1/1982   Southwell .............. 350/164

OTHER PUBLICATIONS

Southwell (2), "Multilayer High Reflective Coating Designs Achieving Broadband 90° Phase Change", SPIE vol. 190, LASL Optics Conference, 1979, pp. 81-88.

Southwell (3) "Multilayer Coating Design Achieving a Broadband 90° Phase Shift" Applied Optics, vol. 19, No. 16, 8-15-80, pp. 2688-2692.

Primary Examiner—John K. Corbin
Assistant Examiner—B. S. Shapiro
Attorney, Agent, or Firm—Homer L. Knearl

[57] ABSTRACT

A phase retardation element, for use in an optical data storage system, which provides a 90° phase difference between two perpendicular polarized components of an incident wave with a single internal reflection from a surface coated with a thin film of dielectric or metal material.

3 Claims, 8 Drawing Figures

PHASE RETARDATION ELEMENT AND PRISM FOR USE IN AN OPTICAL DATA STORAGE SYSTEM

FIELD OF THE INVENTION

This invention relates to optical components and more particularly to a phase retardation element for use in an optical data storage system.

DESCRIPTION OF THE PRIOR ART

Phase retardation plates are widely used in optics to modify the polarization of a beam of light. For example, optical data storage systems use a laser to generate a polarized beam of radiation. The beam is directed onto a rotating disk. The intensity of the reflected or transmitted beam varies according to the data recorded on the disk. A phase retardation plate is placed in the optical path to allow the use of a polarized beam splitter to deflect the reflected beam to a detector. Since the data tracks may be one micron in width, it is critical that the optical elements be precisely aligned. To this end, the incident and reflected beams share as much as possible of the optical system. The fewer components in the system, the better, since cost and reliability are improved.

The most commonly used phase retardation element is the birefringent quarter wave plate which produces a phase difference of 90° between two perpendicular polarizations. It is used to transform linear polarized light into circular polarized and vice versa. A single order quarter wave plate is necessary for optical data storage system using a GaAs laser because of the center wavelength variation between lasers.

While a quarter wave plate performs satisfactorily, it is expensive to manufacture and adds to the assembly cost. To reduce cost, attempts have been made to replace the expensive birefringent single order quarter wave plate with a cheaper optical element. In one of these attempts the phase shift was produced by reflection from a thin film structure. While the cost of such structures is less than a quarter wave plate, use of thin films in optical data storage systems introduced other complications. As the maximum phase shift obtained by external reflection from a single thin film was less than 30°, at least four such reflections were required to obtain the desired phase shift of 90°. Alternatively, if an internal gas-air surface is used at least two internal reflections are necessary. This adds to the cost and complicates the mounting and alignment to the point where any advantage over the quarter wave plate is lost. Moreover, the requirement that the reflectivity should be close to 100% for both polarizations limits the design freedom drastically.

SUMMARY OF THE INVENTION

The principle object of the invention is to provide a thin film structure producing phase shift of 90° between two polarizations with a single internal reflection.

Another object of the invention is to provide an optical data storage system which has an optical path incorporating a thin film on the surface of one of the elements to provide a phase shift of 90°.

A further object of the invention is to reduce the number of optical elements in an optical data storage system by combining the thin film phase shift surface element with another element.

These objects are accomplished by reflecting the light from the thin film structure from the inside of a beam splitting prism in such a way that total reflection occurs at one of the film-glass boundaries.

DESCRIPTION

Figure 1:
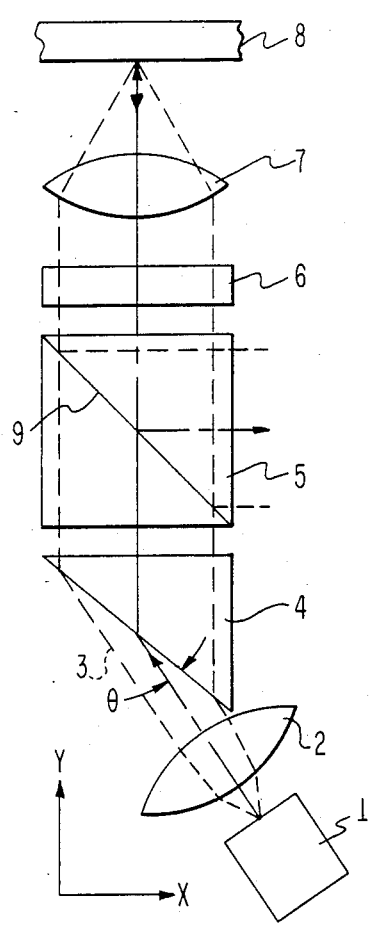
FIG. 1 is a schematic representation of the optical path in a data storage system.

FIG. 1 shows the optical path in a typical optical data storage system. Such systems are more fully described in "Optical Recording: High-Density Information Storage And Retrieval" by Robert A. Bartolini, Proceedings of IEEE, Vol. 70, No. 6, June 1982, pp. 589–597. Semiconductor laser 1 and collimating lens 2 generate a light beam 3 which is p—polarized and collimated but of elliptical cross-section. Projecting said light beam at an appropriate angle $\theta$ onto prism 4 produces a light beam of circular cross-section propagating in the Y direction. Polarizing beam splitter 5 allows the p—polarized light beam to pass straight through toward quarter wave plate 6. Quarter wave plate 6 changes the polarization of the light beam to circular. Lens 7 projects the light beam onto mirror-like surface of optical disk 8 where it is reflected back along the same path from which it came. Quarter wave plate 6 now changes the circular polarization of the light beam to s—polarization. The s—polarized light beam is now reflected in the X direction at internal surface 9 of polarizing beam splitter 5. The surfaces of prism 4, polarizing beam splitter 5 and quarter wave plate 6 are coated with an anti-reflection film selected according to the angle of incidence and wavelength of the light beam.

Figure 2:
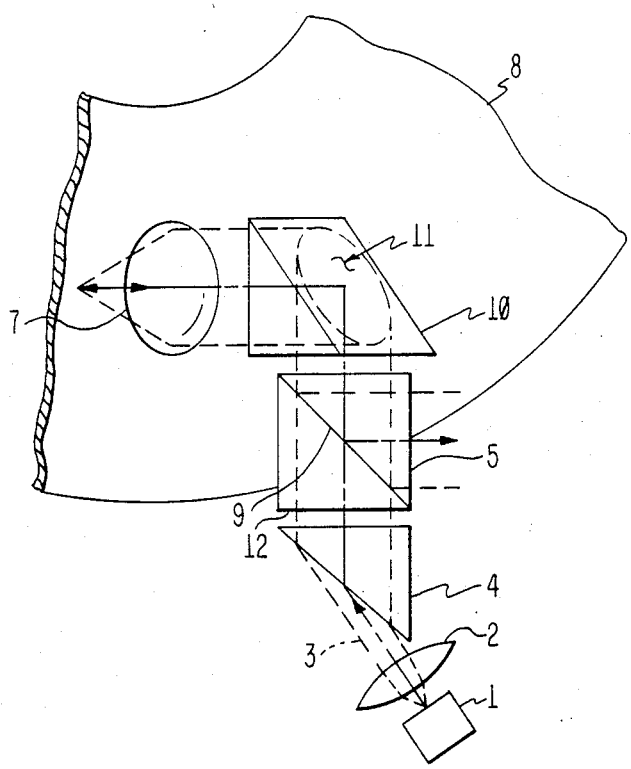
FIG. 2 is a view of the optical system of FIG. 1 wherein the quarter wave plate has been replaced by a thin film phase retardation element.

FIG. 2 shows the optical system of FIG. 1 in which, according to the invention, quarter wave plate 6 has been replaced by a thin film retardation element 10 comprising a prism whose face 11 corresponding to the hypotenuse is coated by a conventional process with a thin film structure of a material of suitable index of refraction and thickness to effect the desired 90° phase retardation in the incident and return light beams. Prism 10 is rotated by 45° about the optical axis with respect to polarizing beam splitter 5 to resolve the light beam into two components. When incident light beam 3 penetrates prism 10 it is totally reflected from the thin film structure at surface 11 of prism 10 and its polarization is changed to circular. Lens 7 projects the light beam onto the surface of optical disk 8 where it is reflected back along the same path from which it came. When the return light beam penetrates prism 10 it is totally reflected from the thin film structure at surface 11 of prism 10 and its polarization is changed (from circular) to s—polarized. Possible thin film structures are, for example, a single film of dielectric material, a multilayer film or a single metal film.

Figure 3:
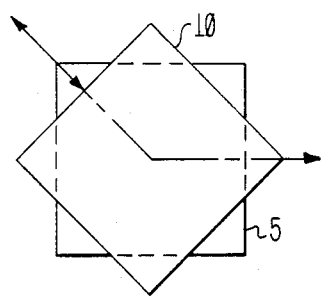
FIG. 3 is a top view of the polarizing beam splitter and the thin film phase retardation element of FIG. 2.

FIG. 3 is a top view of polarizing beam splitter 5 and prism 10 from FIG. 2.

Figure 4:
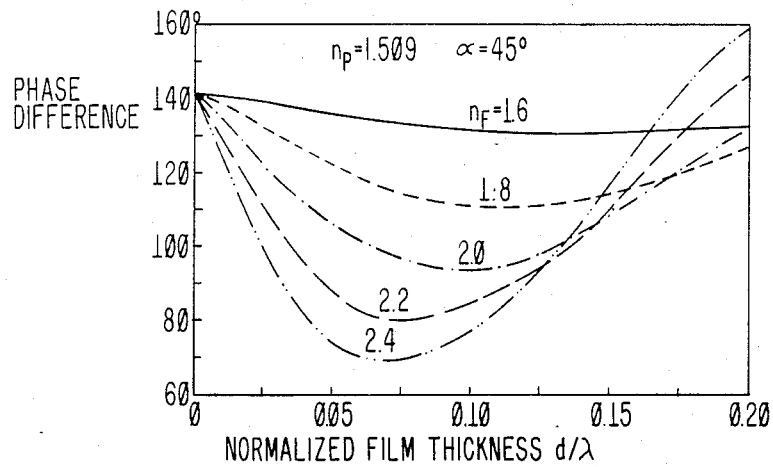
FIG. 4 represents the phase difference between two polarization components of an internally reflected beam as a function of the normalized thickness for different dielectric materials coated on a prism.

FIG. 4 represents the phase difference between s-13 polarized and P—polarized light reflected from a single film of dielectric material of thickness d and index of refraction $n_F$ coated on a prism of index of refraction $n_p = 1.509$ as a function of the normalized thickness $d/\lambda$, of the film where $\lambda$ is the wave length of the light, produced by laser 1 and an angle of incidence $\alpha = 45°$.

As can be seen, a phase difference of 90° is obtainable for a film with a refractive index $n_F$ greater or equal to 2.05. For example, a phase retardation of 90° was obtained with a film of $TiO_2$ for $n_F = 2.05$ to 2.1 d = 700 Å and wavelength $\lambda = 0.65$ to 0.9 $\mu$m. By selecting the refractive index of the film one can select how fast the phase difference changes with a change of wavelengths. Compared to the single order birefringent quarter wave plate, where the phase difference is approximately proportional to $1/\lambda$, the retardation of the thin film quarter wave element can be much less dependent on wavelength.

If a multilayer film is coated on a prism a specific performance can be designed. One can, for example, design coatings where the phase difference is constant within a wide band of wavelengths or angles of incidence.

Figure 5:
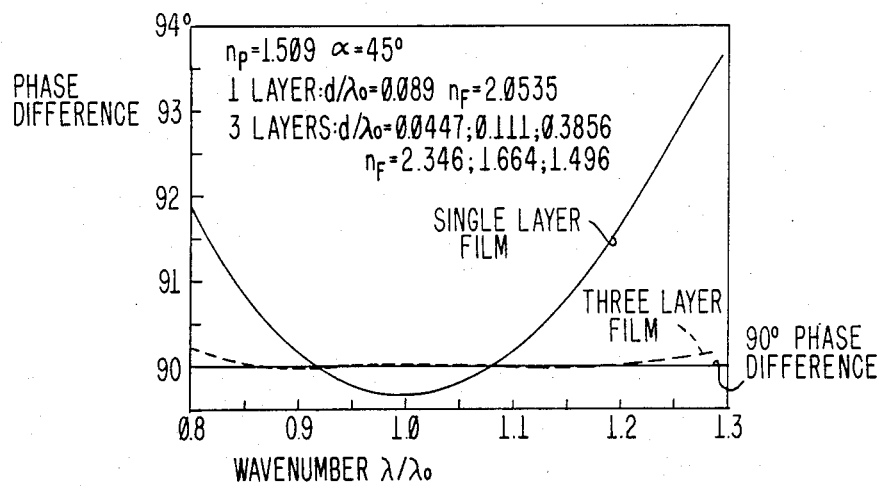
FIG. 5 represents the phase difference between two polarization components of an internally reflected light beam as a function of the wave number for a single film and for a three-layer thin film structure coated on a prism.

FIG. 5 gives an example of the performance of a three-layer design optimized to give a phase shift of 90° for wave $\lambda/\lambda_0$ numbers between 0.9 and 1.2, $n_p = 1.509$ and $\alpha = 45°$. Wavelength $\lambda_0$ is the wavelength, against which the other wavelengths $\lambda$ are normalized, and for example would be the center design wavelength 0.82 $\mu$m of a GaAs laser.

As a comparison, the solid curve in FIG. 5 also gives the performance for an optimized single layer film.

Phase retardation can also be obtained from a prism coated with a single metal film. The advantage of the metal film is its uncritical thickness. Metals suitable for coating are for example Al ($\lambda = 0.2$ $\mu$m), Ag ($\lambda = 0.4$ $\mu$m), K ($\lambda = 0.546$ $\mu$m; 0.4358 $\mu$m).

Figure 6:
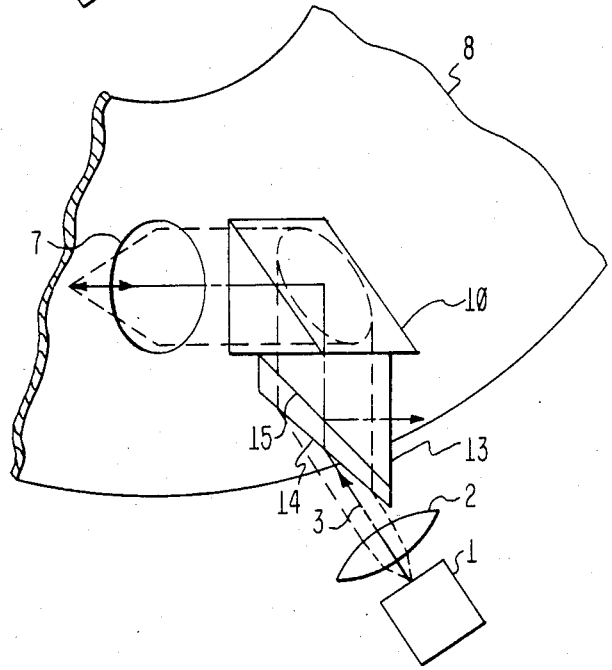
FIG. 6 is a view of an improved combination of the optical elements of FIG. 2.

In a preferred embodiment, the function of prism 4 can be combined with that of polarizing beam splitter 5 by simply cutting the entrance face 12 of polarizing beam splitter 5 at the same angle as used in prism 4 to obtain prism 13, shown in FIG. 6, and bonding phase retardation element 10 to prism 13 with an appropriate index matching adhesive. This eliminates four glass-to-air interfaces, thereby improving optical efficiency.

Figure 7:
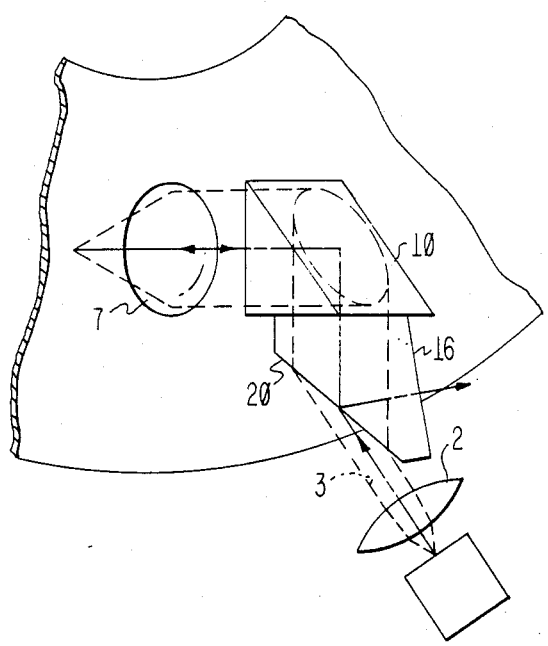
FIG. 7 is a view of a further improved combination of the optical elements of FIG. 6.

Referring to FIG. 7, prism 16 represents a further improvement obtained by combining the anti-reflection coating of surface 14 (FIG. 6) and the polarizing beam splitter coating of interface 15 of polarizing beam splitter 13 shown in FIG. 6. This combined coating 20 can be, for example, a multilayer stack of material having alternatingly higher and lower indices of refraction than the prism itself.

Figure 8:
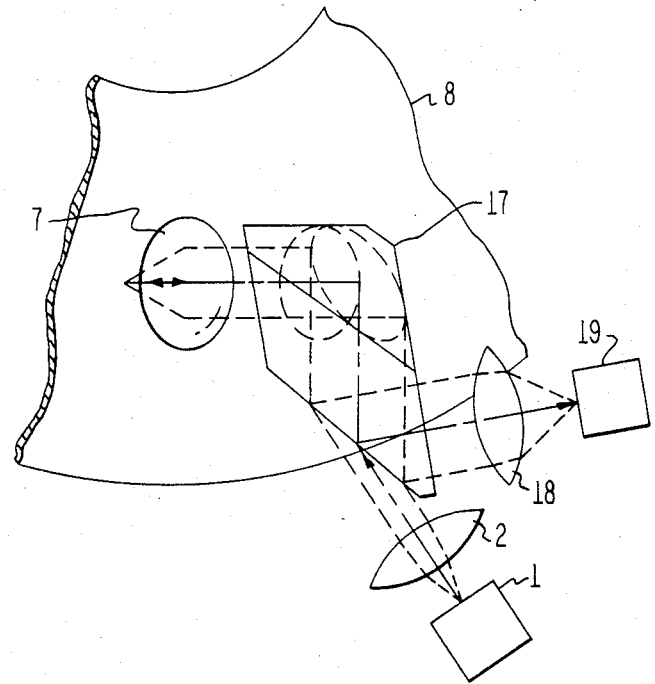
FIG. 8 is a view of a further improved combination of the optical elements of FIG. 7.

FIG. 8 shows an overall view of an optical data storage system incorporating a prism formed by combining prism 10 and prism 16 in a unitary structure 17, thereby eliminating another bonded interface.

Laser 1 and collimating lens 2 generate a collimated light beam of elliptical cross-section which is projected at an appropriate angle onto prism 17. Prism 17 combines the functions of prism 4, polarizing beam splitter 5 and thin film phase retardation element 10 shown in FIG. 2. After emerging from prism 17, the return light beam is relayed to detector 19 by, for example, lens 18. Detector 19 may be composed of four or more sectors to extract data, tracking and focus information from the light beam.

We claim:

1. An optical element for producing a phase difference of 90° between two perpendicular polarized components of a beam of radiation internally reflected in said element comprising:
    an optical member formed of a material capable of supporting the propagation of a beam of radiation having a wavelength within a wavelength range extending from 0.74 $\mu$m to 0.98 $\mu$m;
    a plane surface portion of said member;
    a plurality of thin film coatings of dielectric materials layered on said plane surface portion;
    said thin film coatings being of materials and thicknesses to produce throughout said wavelength range of substantially constant phase difference of 90° between two perpendicular polarized components of said beam of radiation when said beam is internally reflected at said plane surface portion.

2. An optical element according to claim 1 wherein said member is a prism and said plane surface portion is one face of said prism.

3. The optical element of claim 1 wherein:
    said plurality of thin film coatings comprises three coatings having indices of refraction of substantially 2.3, 1.7 and 1.5 and having normalized thicknesses of substantially 0.045, 0.111 and 0.386 respectively.

* * * * *